United States Patent [19]

Hickey

[11] Patent Number: 5,746,362
[45] Date of Patent: May 5, 1998

[54] HEAVY DUTY VEHICLE RACK

[75] Inventor: David R. Hickey, Darien, Ill.

[73] Assignee: Cross Tread Industries, Inc., Hinsdale, Ill.

[21] Appl. No.: 692,040

[22] Filed: Aug. 2, 1996

Related U.S. Application Data

[63] Continuation of Ser. No. 309,915, Sep. 21, 1994, abandoned.

[51] Int. Cl.⁶ .................................................. B60R 9/04
[52] U.S. Cl. ............................ 224/331; 224/322; 224/319
[58] Field of Search .................................. 224/321, 328, 224/329, 330, 331, 319, 316, 309, 322; 248/231.6, 316.6, 343

[56] References Cited

U.S. PATENT DOCUMENTS

| | | | |
|---|---|---|---|
| 3,920,167 | 11/1975 | Parsons | 224/331 |
| 4,401,247 | 8/1983 | Zoor | 224/331 |
| 4,640,450 | 2/1987 | Gallion et al. | 224/328 |
| 4,817,838 | 4/1989 | Kamaya | 224/319 |
| 5,160,075 | 11/1992 | Moscovitch | 224/328 |

FOREIGN PATENT DOCUMENTS

| | | | |
|---|---|---|---|
| 4041309 | 6/1992 | European Pat. Off. | 224/331 |
| 2548675 | 5/1977 | Germany | 224/331 |
| 2822853 | 11/1979 | Germany | 224/316 |
| 3443377 | 5/1986 | Germany | 224/329 |
| 3604772 | 8/1987 | Germany | 224/329 |
| 4001546 | 7/1991 | Germany | 224/331 |

OTHER PUBLICATIONS

J.C. Whitney & Co. Catalog No. 559D; see p. 99, 1993.

Primary Examiner—Henry J. Recla
Assistant Examiner—Gregory M. Vidovich
Attorney, Agent, or Firm—Juettner Pyle Lloyd & Piontek

[57] ABSTRACT

A heavy duty vehicle rack for the attachment to the drip rails or gutters of a vehicle is useful for carrying heavy articles, such as pipes, ladders, etc. The vehicle rack has at least one crossmember which extends across the vehicle roof and has an end member on each end of the crossmember to engage the drip rail or gutter and hold the crossmember above the vehicle roof. A clamp with horizontal fastening tightly secures each of the end members to the drip rail. The end members and clamps have inclined cooperating portions thereon which also cause the clamp to tighten against the drip rail also vertically to hold the rack in place on the vehicle.

20 Claims, 2 Drawing Sheets

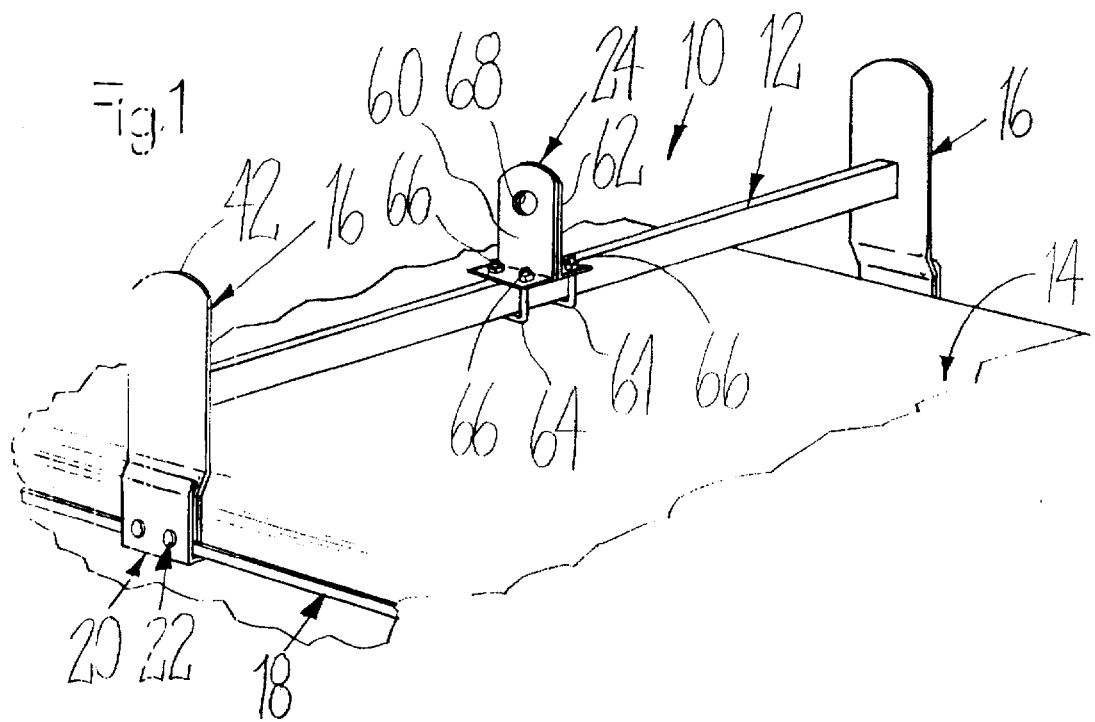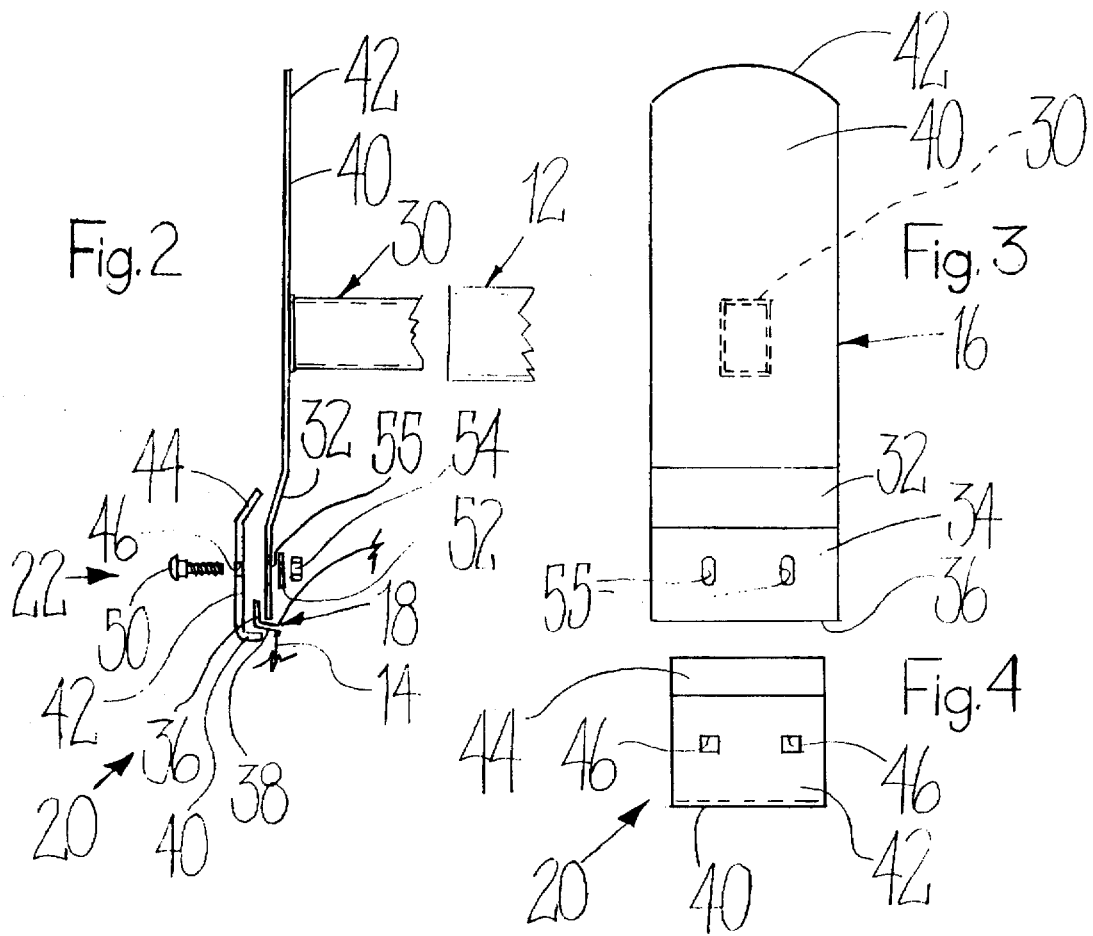

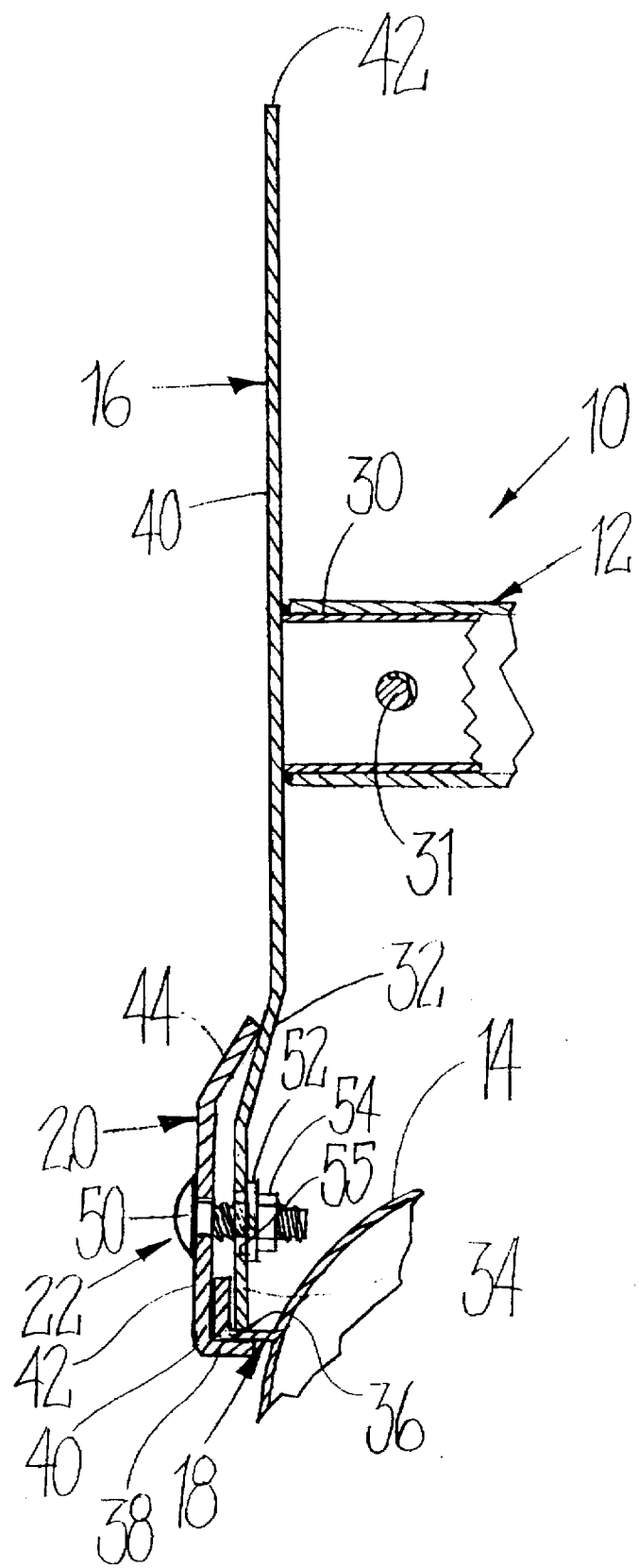

HEAVY DUTY VEHICLE RACK

This is a continuation of application Ser. No. 08/309,915 filed on Sep. 21, 1994 now abandoned.

This invention relates to racks for vehicles and particularly a rack which grips the gutter or drip rail on the vehicle.

BACKGROUND OF THE INVENTION

Heretofore it has been known to provide a rack for a vehicle, such as a van, truck or automobile for carrying items above the roof of the vehicle or van. Frequently such racks comprised two spaced apart crossmembers which are mounted to the gutters or drip rails of the vehicle. As heavy items, such as ladders and pipes, are frequently carried on such a rack, it is important that the rack be solidly and strongly connected to the gutter or drip rail. Heretofore it has been known to provide a connection on each end of each crossmember which utilized one set of fastening means arranged generally horizontally to pull the rack tight against a vertical portion of the drip rail and a second set of fastening means arranged generally vertically to pull the rack tight against a horizontal portion of the drip rail. As there are usually two crossmembers each with two ends there were generally at least eight sets of fasteners which are required to be properly horizontally and vertically adjusted and tightened. An alternative sometimes used was to replace the second sets of vertical fastening means with some sort of pivoting connection, such as formed by a pivot point extension which engages in a formed pivot opening. The provision of such pivoting connection can be more expensive to make as forming dies may be needed to make the pivot extension and/or pivot opening. Further the pivot type connection can be even more difficult to tighten securely because of "play" and looseness of the pivot connection making the pivot connection less secure to use than the first described two sets of horizontal and vertical fastening means, particularly where a rack is to carry heavy items, such as is likely to be used by a tradesman on his service van.

SUMMARY OF THE INVENTION

The rack of the present invention preferably comprises two or more crossmembers which are secured at each end thereof by a clamp member held to the end of the crossmember by a single set of generally horizontal fastening means, with no separate vertical fastening means or pivot connecting means being utilized. A tight connection in both the horizontal and vertical is provided by the single set of generally horizontal fastening means. The crossmember's ends and clamps are arranged to be clamped together horizontally by this fastening means, and each has inclined engaging portions to cause the clamp to engage the gutter or drip rail and pull it tight both vertically and horizontally against the crossmember end.

Thus, by merely fastening the single set of generally horizontal fastening means on the end of its crossmember and its respective clamp, that end of the crossmember can be tightly and securely fastened to the gutter and/or drip rail. The rack of the present invention so tightly grips the gutter or drip rail both horizontally or vertically, that its particularly suitable for use by tradesman and on their service vans or vehicles. Due to its unique construction the rack of the present invention can be easily and securely attached to a drip rail or gutter on a van or vehicle. Additionally, the end members can be extended upwardly vertically to form a cargo stop. Further, an adjustable stop can also be provided on the crossmember intermediate the two ends to secure items, such as ladders or pipes in place between it and a crossmember end.

It is an object of the present invention to provide a heavy duty vehicle rack suitable for use by trades persons.

It is another object of the present invention to provide a rack which can be easily but strongly attached to a vehicle.

Yet another object of the present invention is to provide a rack which attaches tightly to the drip rail of a vehicle using only generally horizontal fastening means that will self tighten vertically against the drip rail.

These and other objects of the present invention will become apparent from the accompanying drawings and following written description.

DESCRIPTION OF THE DRAWINGS

FIG. 1 is a perspective view of the rack of the present invention shown mounted to the drip rails or gutters of a vehicle, such as a van.

FIG. 2 is an exploded view of one end of the rack of the present invention shown in FIG. 1, but shown in an unconnected state.

FIG. 3 is an elevational view of the crossmember end shown in FIGS. 1 and 2.

FIG. 4 is an elevational view of the clamp portion shown in FIGS. 1 and 2.

FIG. 5 is a cross-sectional view of the left end of the rack shown in FIG. 1, showing how the rack is assembled and secured to the vehicle left side drip rail.

DESCRIPTION OF THE PREFERRED EMBODIMENT

Referring to FIG. 1, the vehicle rack 10 of the present invention is shown. The rack 10 includes, at least one and preferably two crossmembers 12 which are held above the vehicle roof 14 by two end members 16. Each end member 16 rests upon the vehicle's gutter or drip rail 18 and is tightly held there by a clamp 20. The clamp 20 also engages the drip rail and is held to the end member 16 by generally horizontal fastening means 22. In this instance fastening means 22 consists of a set of two bolts and nuts. If desired, an additional intermediate mount 24 can be provided for the crossmember 12. Now that the overall construction of the vehicle rack of the present invention has been described, additional details are set forth below.

Referring to the crossmember 12, it preferably is made of rectangular, possibly square, cross section steel or aluminum tubing of 4 inches by 4 inches with ¼ inch thick wall to 1 inch by 1 inch with ⅛ inch thick wall, with about 1½ inch by 2 inch with 3/16 inch thick wall being preferred. Of course, other size or shape tubing could also be used. Preferably the crossmember 12 is made in two parts, an inner part and an outer part which telescopes together to provide an exact fit for the width of various vehicles. The crossmember's 12 outer part is secured, as by welding to one of the end members 16, in this instance the right one shown in FIG. 1. The other end member 16, the left one in FIG. 1, is secured, as by welding to the inner part of the crossmember 12, a stub member 30, which is of a similar cross section as the outer part of crossmember 12, but of a smaller size so as to telescope inside of the outer part of crossmember 12. The crossmember 12 and its two parts can then be provided in a kit form of a sufficient length, compared to the width of the vehicle roof 14, and then, if need be, cut to a length to exactly fit the vehicle's roof width. The stub 30 and outer portion of crossmember 12 can be drilled at a point where they overlap and then secured together with a fastener such as a bolt 31 (FIG. 5) and nut, preferably of the self locking Nylock type. Thus, a single kit for the roof rack and crossmember of the present invention can be easily custom fitted to a variety of width vehicles. Optionally the crossmember could be a single piece of a width to fit across the vehicle and having the end members secured to its respective ends.

Each of the two end members 16 is similar to the other, and in essence a mirror image of one another. As is shown in FIGS. 1, 2 and 3, the end members 16 are generally vertical with a slightly inclined or dog leg portion 32 bent or inclined toward each other when moving upwardly. The leg portion 32 is at an angle from vertical of 20 degrees to 40 degrees and for the FIG. 1 embodiment is about 30 degrees. The lower portion 34 of the end member 16 is generally vertical and has a bottom edge 36 for engaging the horizontal portion 38 of the "L" shaped drip rack or gutter 18 on the vehicle roof 14. The upper portion 40 of the end member 16 is also vertical and terminates in an attractive curve 42. This upper portion 40 forms a cargo stop to keep whatever is placed on the crossmember 12 from shifting and/or falling off. If desired, an opening could be provided in the end 16 to assist securing a tie down rope. As was heretofore mentioned, the crossmember 12 or its associated stub is secured to one or the other end members above their inclined portions 32.

As mentioned, to hold the end member in place on the drip rails 18, the clamp 20 is provided. The clamp 20 has a lower end which is "L" shaped having a generally horizontal part 40 and a generally vertical part 42. Above the part 42 is an inclined portion 44 which is inclined at an angle from vertical (in relation to the part 42) at an angle of 25 degrees to 45 degrees, and in this FIG. 1 embodiment of about 35 degrees. Generally, the cooperating piece 32 and piece 44 should have a relative angle of say 2.5 to 7.5 degrees between them to provide the desired clamping or tightening action, which permits the use of only horizontal fastening means and eliminates the need for vertical fastening means. The clamp 20 also has opening means, in this instance two openings 46 for the first set of generally horizontal fastening means 22, which in this instance are a bolt 50, washer 52 and nut 54. Corresponding elongated openings 55 are also provided in the end member 16. The washer 52 could be eliminated and/or in the form of a lock washer. Preferably, the nut 54 is of the self locking type with a nylon or the like insert so that no lock washer is needed. Preferably to prevent rotation of the bolt 50, it is of carriage bolt construction having a square shank just below the bolt head. Similarly the opening 46 in the clamp 20 are square to accommodate such bolt and prevent its rotation. See FIG. 4.

As shown in FIG. 1, the intermediate member 24 is made from two "L" shaped bent members 60 and 62 secured back to back together as by welding. The lower legs of the two members 60 and 62 are secured to the crossmember 12 with threaded "U" bolts 64 and self-locking nuts 66. For ease of securing ties, an opening can be provided.

The manner in which the clamp 20 secures the end member 16 and its attached crossmember 12 inner and outer parts to the drip rail 18 of the vehicle roof 14 is shown in FIG. 5. As is shown the horizontal fastening means forces the clamp 20 tight against the end member 16. At the same time the lower end 40 of the clamp is forced upwardly to sandwich the drip rail against the bottom 36 of the end member 16. This upward action is caused by the inclined, upper portion 44 of the clamp 20 climbing up the inclined portion 32 of the end member 26. Thus, the drip rail 18 is tightly gripped both vertically and horizontally by a single set of horizontal fastening means 22, i.e. the two bolts 50 on each end member 16.

While the preferred embodiment of vehicle rack of the present invention has been illustrated and described, from the foregoing it should be understood that variations, modifications which are equivalent structures thereof fall within the scope of the appended claims.

What is claimed is:

1. A heavy duty vehicle rack for securing heavy items to the drip rails of a van type vehicle, comprising a rectangular cross section tubing cross member adapted to extend horizontally across the full width of a van type vehicle roof generally from one drip rail to the drip rail on the opposite side of the van type vehicle roof, said cross member having opposing ends defining a length therebetween, said length being substantially parallel to a horizontal plane, said cross member tubing made of one of steel and aluminum having a minimum wall thickness of 3/16 of an inch, a pair of unitary one piece end members, one secured by welding at each end of said cross member, each of said end members being bent from flat material, said unitary one piece end members extending generally downwardly from said cross member towards said drip rails, respectively, each said unitary one piece end member at its lower end being bent and adapted to rest on said van type vehicle drip rail, clamping means for each unitary, one piece end member shorter in height than said unitary, one piece end member, each said clamping means being bent from flat material and having a bent "L" shaped lower end adjacent its associated unitary, one piece end member, said bent "L" shaped lower end and said lower end of said unitary, one piece end member being adapted to sandwich the adjacent van type vehicle drip rail, said unitary, one piece end member having an intermediate bent portion between the location where said unitary, one piece end member is welded to the cross member and the lower end of the unitary, one piece end member, said clamping means having an upper bent end, both said intermediate bent portion of said unitary, one piece end member and said upper bent end of said clamping means being inclined inwardly toward the opposite unitary, one piece end member and upwardly with the inclination of said clamping means from horizontal being less than that of said intermediate bent portion, and fastening means generally extending parallel to said cross member for pulling said clamping means against said unitary, one piece end member to tightly sandwich the drip rail to hold the heavy duty rack to the van type vehicle drip rail and to slide said upper end of said clamping means inwardly and upwardly along said intermediate portion of said unitary, one piece end member, whereby tightening said fastening means pulls said clamping means horizontally tight against said unitary, one piece end member and simultaneously causes said upper bent end, inclined portion of said clamping means to slide up the inclined intermediate bent portion of said unitary, one piece end member to pull said "L" shaped end of the clamping means vertically upwardly to tightly hold the heavy duty rack to the van type vehicle drip rail, whereby heavy loads such as ladders and/or pipes may be carried.

2. In the rack of claim 1, wherein said intermediate portion is inclined relatively from the horizontal at an angle of about 2.5 to 7.5 degrees greater than that for said upper end portion of said clamping means.

3. In the rack of claim 1, wherein said fastening means comprises a generally horizontal nut and bolt, and said unitary, one piece end member and said clamping means having openings to receive said bolt.

4. In the rack of claim 1, wherein said fastening means comprises a self locking fastener.

5. In the rack of claim 4, wherein said self locking fastener has a self locking nut.

6. In the rack of claim 1, wherein said cross member is in two parts, each part of said crossmember having an inner and an outer end, the outer end of each part of said cross member being fastened to one of said unitary, one piece end members, respectively, the inner ends of said two parts of said crossmember being secured together to each other, whereby one of said parts of said crossmember may be cut to fit the width of the van type vehicle and then the two parts secured together.

7. In the rack of claim 6, wherein one of said inner ends of said parts of said crossmember telescopes within the inner end of said other of said parts of said crossmember.

8. In the rack of claim 1, further comprising an intermediate stop, said intermediate stop being adjustable along the length of said crossmember and secured to said crossmember.

9. In the rack of claim 1, wherein said intermediate portion is inclined from a vertical axis a first angle of about 25 to 35 degrees and said upper end portion of said clamping means is inclined from vertical at a second angle of about 30 to 40 degrees, with said first angle being at least 2.5 degrees less than said second angle, said fastening means comprising a generally horizontal self-locking nut and bolt, and said unitary, one piece end member and said clamping means having openings to receive said bolt, said cross member being in two parts, with each part of said cross member being fastened to one of said unitary, one piece end members, one of said parts being the inner part and the other of said parts being the outer part, said inner part being telescoped within the outer part, second fastening means for said cross member for securing said two parts together, whereby one of said parts of said cross member may be cut to fit the width of the van type vehicle and then the two parts of said cross member secured together.

10. In the rack of claim 9, said outer part of said cross member being of a length substantially that of the distance to span the width of said van type vehicle, said inner part of said cross member being of a length sufficient to fasten said outer and inner parts together, further comprising an adjustable intermediate stop securable in any position along the length of said outer part of said cross member, additional fastening means for securing said intermediate stop in position on said outer part.

11. In the rack of claim 1, wherein said intermediate portion is inclined from vertical at an angle of about 25 to 35 degrees and said upper end of said clamping means is inclined from vertical at an angle of about 30 to 40 with said upper end of clamping means being inclined from vertical at a greater angle than the angle said intermediate portion is inclined from vertical.

12. In the rack of claim 1, wherein said upper end of said clamping means and the intermediate portion when assembled on the heavy duty rack are at relative angles to each other of about 2.5 to 7.5 degrees.

13. In the rack of claim 12, wherein said relative angle is about 5 degrees.

14. In the rack of claim 1, wherein said upper portion of said clamping means when assembled on the rack is about 35 degrees from vertical.

15. In the rack of claim 14, wherein said intermediate portion when assembled on the heavy duty rack is about 30 degrees from vertical.

16. In the rack of claim 10, wherein said intermediate portion of said heavy duty rack and said upper end of said clamping means are at a relative angle of about 5 degrees.

17. In the rack of claim 1, wherein said fastening means comprises a pair of bolts and associated nuts for each unitary, one piece end member and its associated clamp means, each of said unitary, one piece end members and its associated clamping means having a pair of openings therein to receive said pair of bolts, said pair of bolts and said pairs of openings being spaced apart horizontally along said unitary, one piece end members, whereby the clamping means and unitary, one piece end members can be tightly fastened to the van type vehicle drip rail.

18. In the rack of claim 1, wherein said unitary one piece members are generally perpendicular to said crossmember and project generally vertically above the drip rail of the van type vehicle and the load on the end of the crossmember is transferred generally only vertically through the unitary one piece end member to the drip rail of the van type vehicle.

19. In the rack of claim 18, wherein said fastening means comprises a pair of bolts and associated nuts for each unitary, one piece end member and its associated clamp means, each of said unitary, one piece end members and its associated clamping means having a pair of openings therein to receive said pair of bolts, said pair of bolts and said pairs of openings being spaced apart horizontally along said unitary, one piece end members, whereby the clamping means and unitary, one piece end members can be tightly fastened to the van type vehicle drip rail.

20. In the rack of claim 10, wherein said fastening means comprises a pair of bolts and associated nuts for each unitary, one piece end member and its associated clamp means, each of said unitary, one piece end members and its associated clamping means having a pair of openings therein to receive said pair of bolts, said pair of bolts and said pairs of openings being spaced apart horizontally along said unitary, one piece end members, said unitary, one piece end members are generally perpendicular to said crossmember and project generally vertically above the drip rail of the van type vehicle, and the load on the end of the crossmember is transferred generally only vertically through the unitary one piece end member to the drip rail of the van type vehicle, whereby the clamping means and unitary, one piece end members can be tightly fastened to the van type vehicle drip rail.

\* \* \* \* \*